United States Patent
Jung et al.

(10) Patent No.: US 8,472,762 B2
(45) Date of Patent: Jun. 25, 2013

(54) BIOMIMETIC COMPOUND EYE OPTICAL SENSOR AND FABRICATING METHOD THEREOF

(75) Inventors: Kyu-Dong Jung, Suwon-si (KR); Ki-Hun Jeong, Daejeon-si (KR); Dong-Min Keum, Daegu-si (KR)

(73) Assignees: Samsung Electronics Co., Ltd., Suwon-si (KR); Korea Advanced Institute of Science and Technology, Daejeon-si (KR)

( * ) Notice: Subject to any disclaimer, the term of this patent is extended or adjusted under 35 U.S.C. 154(b) by 230 days.

(21) Appl. No.: 12/981,760

(22) Filed: Dec. 30, 2010

(65) Prior Publication Data

US 2012/0106889 A1    May 3, 2012

(30) Foreign Application Priority Data

Oct. 29, 2010 (KR) .................. 10-2010-0107109

(51) Int. Cl.
*G02B 6/32* (2006.01)
*G02B 6/12* (2006.01)
*G02B 6/34* (2006.01)

(52) U.S. Cl.
USPC ................... 385/33; 385/14; 385/37

(58) Field of Classification Search
USPC ......................................... 385/33
See application file for complete search history.

(56) References Cited

U.S. PATENT DOCUMENTS

| | | | |
|---|---|---|---|
| 5,920,337 A | 7/1999 | Glassman et al. | |
| 7,676,131 B2 | 3/2010 | Luo | |
| 2009/0073569 A1 | 3/2009 | Jiang et al. | |
| 2009/0127439 A1 | 5/2009 | Choi et al. | |
| 2009/0250777 A1 | 10/2009 | Takamiya | |
| 2009/0314929 A1* | 12/2009 | Lee et al. | ......... 250/227.28 |

FOREIGN PATENT DOCUMENTS

| | | |
|---|---|---|
| JP | 2009-252983 A | 10/2009 |
| KR | 10-2007-0033414 A | 3/2007 |

OTHER PUBLICATIONS

Jeong, K.-H., et al., "Biologically Inspired Artificial Compound Eyes", Science, Apr. 2006, pp. 557-561, vol. 312.

* cited by examiner

*Primary Examiner* — Omar Rojas
(74) *Attorney, Agent, or Firm* — Sughrue Mion, PLLC

(57) ABSTRACT

Provided is an optical sensor and an optical sensor fabricating method. The optical sensor includes: a substrate; and an ommatidia located on or inside the substrate, the ommatidia comprising a microlens which receives light, an optical waveguide which transfers the light received through the microlens, and a cone structure comprising a first end connected to the microlens and a second end connected to the optical waveguide, the cone structure having a diameter or a width decreasing in a direction from the first end to the second end.

12 Claims, 9 Drawing Sheets

BIOMIMETIC COMPOUND EYE OPTICAL SENSOR AND FABRICATING METHOD THEREOF

CROSS-REFERENCE TO RELATED APPLICATION

This application claims priority from Korean Patent Application No. 10-2010-0107109, filed on Oct. 29, 2010 in the Korean Intellectual Property Office, the entire disclosure of which is incorporated herein by reference

BACKGROUND

1. Field

Apparatuses and methods consistent with exemplary embodiments relate to a biomimetic compound eye optical sensor, and a fabricating method thereof.

2. Description of the Related Art

Insects are among organisms that exist in the natural world that have compound eyes. A compound eye includes many ommatidiums. In other words, each ommatidium is a unit configuring a compound eye. As such, since the insect's eye is a compound eye including many ommatidiums, the insect has a wider viewing angle than other mammals.

In general, biomimetics is a technology of developing an abiotic system by imitating the systems of organisms. Recently, studies into a technology of developing optical systems by imitating the organism's eyes have been actively going on.

In particular, recently, demands for micro imaging systems are increasing, though there is a limitation in miniaturizing existing optical systems. In order to meet the demands, an imaging system that imitates the insect's compound eye has come into the spotlight.

Since the insect's compound eye has a wide viewing angle, as mentioned above, and can accurately sense objects moving quickly, studies into developing an optical sensor that can sense the locations, movements and distances of objects using the insect's compound eye structure are also actively underway.

SUMMARY

According to an aspect of an exemplary embodiment, there is provided an optical sensor including: a substrate; and an ommatidia located on or inside the substrate, the ommatidia including a microlens which receives light, an optical waveguide which transfers the light received through the microlens, and a cone structure including a first end connected to the microlens and a second end connected to the optical waveguide, the cone structure having a diameter or a width decreasing in a direction from the first end to the second end.

According to an aspect of another exemplary embodiment, there is provided an optical sensor fabricating method including: providing a substrate; and forming an ommatidia on or inside the substrate, the ommatidia including a microlens which receives light, an optical waveguide which transfers the light received through the microlens, and a cone structure including a first end connected to the microlens and a second end connected to the optical waveguide, the cone structure having a diameter or a width decreasing in a direction from the first end to the second end.

BRIEF DESCRIPTION OF THE DRAWINGS

The above and/or other aspects will become more apparent by describing in detail exemplary embodiments with reference to the attached drawings in which.

DETAILED DESCRIPTION OF EXEMPLARY EMBODIMENTS

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
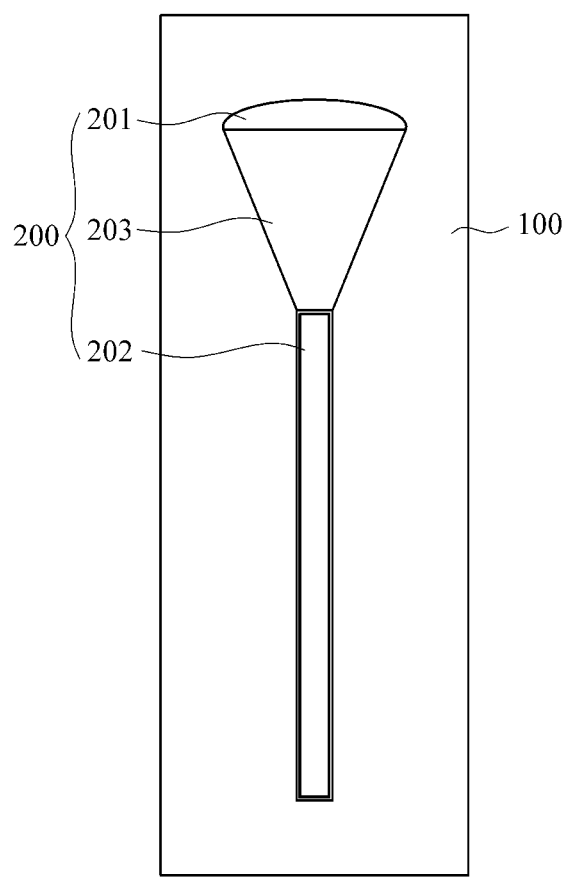
FIG. 1 illustrates an artificial ommatidia according to an exemplary embodiment.

FIG. 1 illustrates an artificial ommatidia according to an exemplary embodiment.

Referring to FIG. 1, the artificial ommatidia includes a substrate unit 100 and an ommatidia unit 200.

The substrate unit 100 includes a material having a first refractive index with respect to light. For example, the substrate unit 100 may be a glass plate.

The ommatidia unit 200 is on or inside the substrate unit 100. The ommatidia unit 200 may include a material having a second refractive index that is different from the first refractive index. For example, the ommatidia unit 200 may be formed by etching and patterning the substrate unit 100 and then depositing or imprinting a material having a different refractive index from that of the substrate unit 200 thereon. Accordingly, due to the difference in refractive index between the ommatidia unit 200 and substrate unit 100, light incident to the ommatidia unit 200 may penetrate the ommatidia unit 200 through total reflection.

According to the current example, the ommatidia unit 200 imitates the insect's compound eye, and includes a microlens 201, an optical waveguide 202, and a cone structure 203, which are similar to an ommatidium of the insect's compound eye.

The microlens 201 imitates a facet lens of the insect's ommatidium and receives light from the outside. For example, the microlens 201 may be implemented in the shape of a convex lens. The microlens having a convex lens shape may focus light from the outside on one end of the optical waveguide 202.

The optical waveguide 202 imitates a rhabodm of the insect's ommatidium and transfers light received through the microlens 201. For example, the optical waveguide 202 may transfer light received through total reflection from one end to the other end. When being likened to an optical fiber, the optical waveguide 202 corresponds to a core and the substrate unit 100 corresponds to cladding.

The cone structure 203 imitates the crystalline cone of the insect's ommatidium. One end of the cone structure 203 is connected to the microlens 201 and the other end thereof is connected to the optical waveguide 202. The diameter or width of the cone structure 203 may be reduced gradually in the direction from the microlens 201 to the optical waveguide 202.

Figure 2:
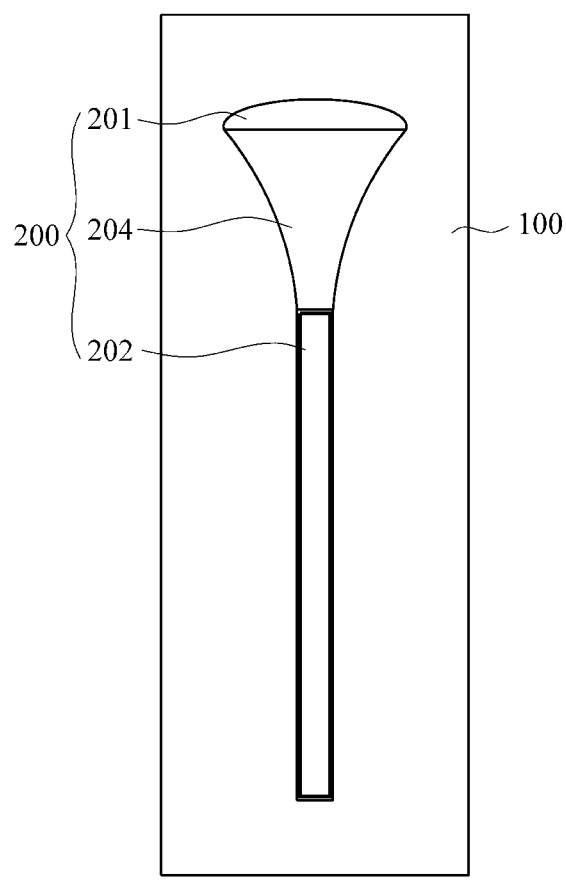
FIG. 2 illustrates an artificial ommatidia according to another exemplary embodiment.

FIG. 2 illustrates an artificial ommatidia according to another exemplary embodiment.

Referring to FIG. 2, the artificial ommatidia includes a substrate unit 100 and an ommatidia unit 200.

In FIG. 2, the structure of the substrate unit 100 and ommatidia unit 200 is similar to that that of the substrate 100 and ommatidia unit 200 illustrated in FIG. 1. However, when comparing the cone structure 203 of FIG. 1 to a cone structure 204 of FIG. 2, the cone structure 203 of FIG. 1 has straight or flat sides, whereas the cone structure 204 of FIG. 2 has curved sides. Here, the sides of each of the cone structures 203 and 204 may indicate parts connecting the microlens 201 to the optical waveguide 202. However, the sides of the cone structures 203 and 204 may be formed in any other shapes.

Figure 3:
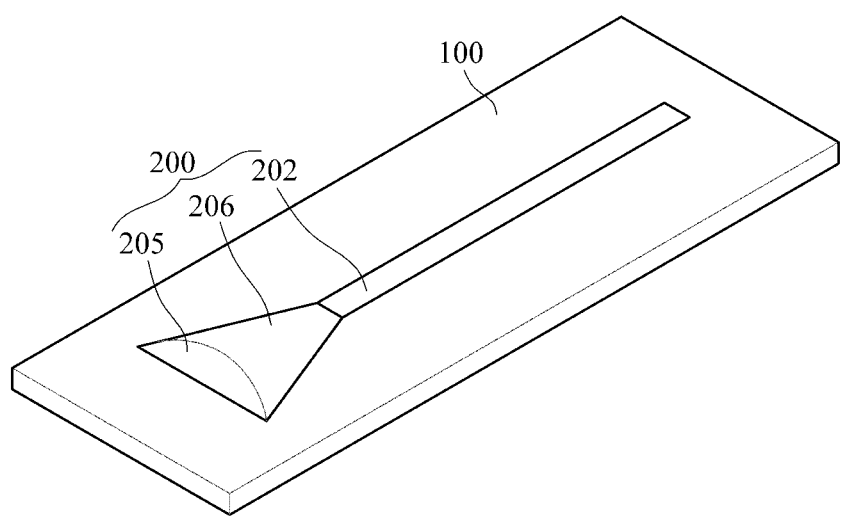
FIG. 3 illustrates an artificial ommatidia according to another exemplary embodiment.

FIG. 3 illustrates an artificial ommatidia according to another exemplary embodiment.

Referring to FIG. 3, the artificial ommatidia includes a substrate unit 100 and an ommatidia unit 200.

In FIG. 3, the structure of the substrate unit 100 and ommatidia unit 200 is similar to that of the substrate unit 100 and ommatidia unit 200 illustrated in FIG. 1. However, when comparing the microlens 201 of FIG. 1 to a microlens 205 of FIG. 3, the microlens 201 of FIG. 1 may be formed in a two-dimensional structure and the microlens 201 of FIG. 3 may be formed in a three-dimensional structure. For example, the microlens 201 of FIG. 1 may be formed in the shape of a half or quarter circle, and the microlens 201 of FIG. 3 may be formed in the shape of a quarter globe. Also, when comparing the cone structure 203 of FIG. 1 to a cone structure 206 of FIG. 3, the cone structure 203 of FIG. 1 is formed in a two-dimensional shape and the cone structure 206 of FIG. 3 is formed in a three-dimensional shape. For example, the cone structure 203 of FIG. 1 may be formed in a trapezoid shape, whereas the cone structure 206 of FIG. 2 may be formed in a half conical shape. Also, the cone structure 206 of FIG. 3 may, although not necessarily, have curved sides.

The flat-type artificial ommatidias illustrated in FIGS. 1 and 2 may be formed by a lithography process, and the three-dimensional artificial ommatidia illustrated in FIG. 3 may be formed by an imprinting process.

Figure 4:
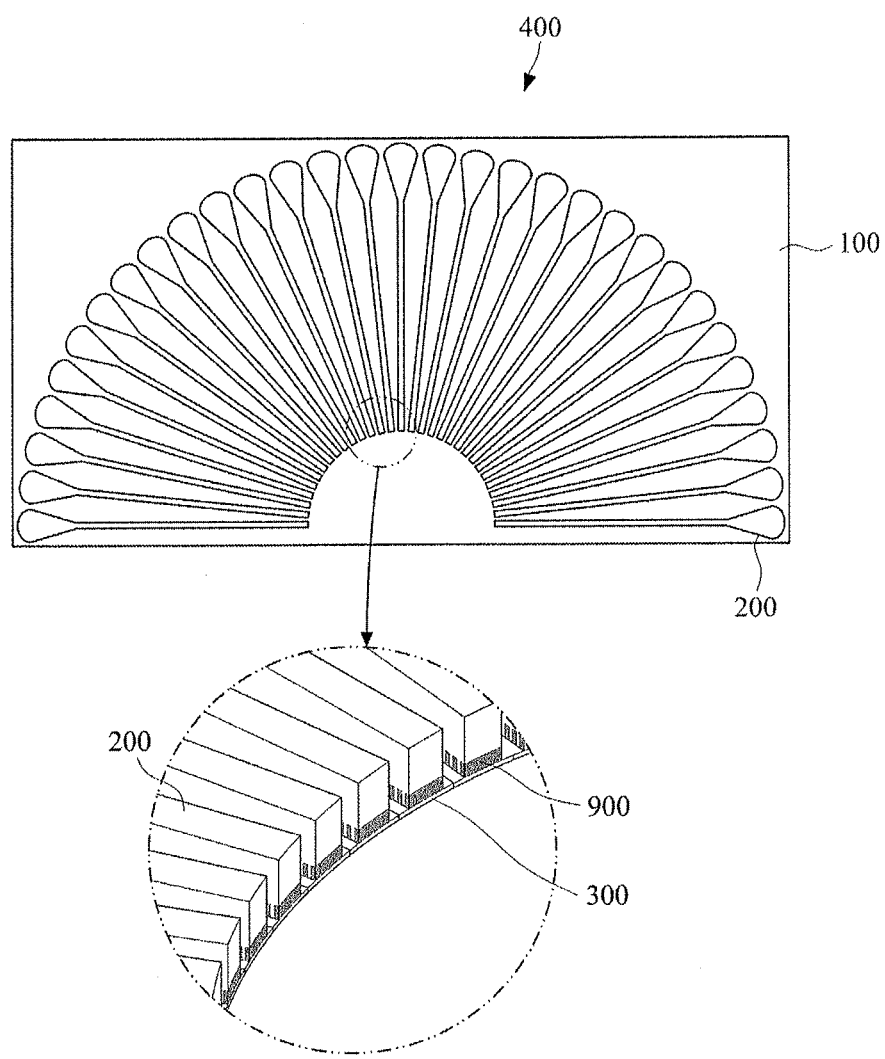
FIG. 4 illustrates an optical sensor according to an exemplary embodiment.

FIG. 4 illustrates an optical sensor 400 according to an exemplary embodiment.

Referring to FIG. 4, the optical sensor 400 includes a substrate 100, a plurality of ommatidias 200, and a plurality of optical detectors 300.

The substrate 100 includes a material having a first refractive index with respect to light. For example, the substrate 100 may be any of the substrate units 100 described above with reference to FIGS. 1, 2 and 3.

The ommatidias 200 include a material having a second refractive index with respect to light, and located on or inside the substrate 100. For example, each ommatidia 200 may be any of the ommatidia units 200 described above with reference to FIGS. 1, 2 and 3.

Also, the ommatidias 200 are arranged in a circular or partially circular form on the substrate 100. In other words, the individual ommatidias 200 are disposed toward different directions within a predetermined angle range between 0 and 360 degrees. For example, the ommatidias 200 may be disposed in a fan shape such that the microlenses (for example, the microlens 201 of FIG. 1) of the individual ommatidias 200 can receive light at incident angles from 0 to 180 degrees. The number and arrangement angles of the ommatidias 200 may be set to appropriate values.

Each optical detector 300 is located correspondingly to an end of each ommatidia 200. The optical detector 300 may be an arbitrary device that can receive light and generate an electrical signal corresponding to the received light. For example, if each optical detector 300 is located near one end of the optical waveguide (for example, the optical waveguide 202 of FIG. 1) of each ommatidia 200, the optical detector 300 may detect light transferred by the optical waveguide 202. The optical detectors 300 also may be, like the ommatidias 200, arranged in a circular or partially circular shape within a predetermined angle range between 0 and 360 degrees.

Also, the optical detectors 300 may be arranged in the lower portion of the substrate 100. When the optical detectors 300 are arranged in the lower portion of the substrate 100, gratings 900 for reflecting light passing through the ommatidias 200 toward the optical detectors 300 may be arranged near ends of the ommatidias 200.

Figure 5:
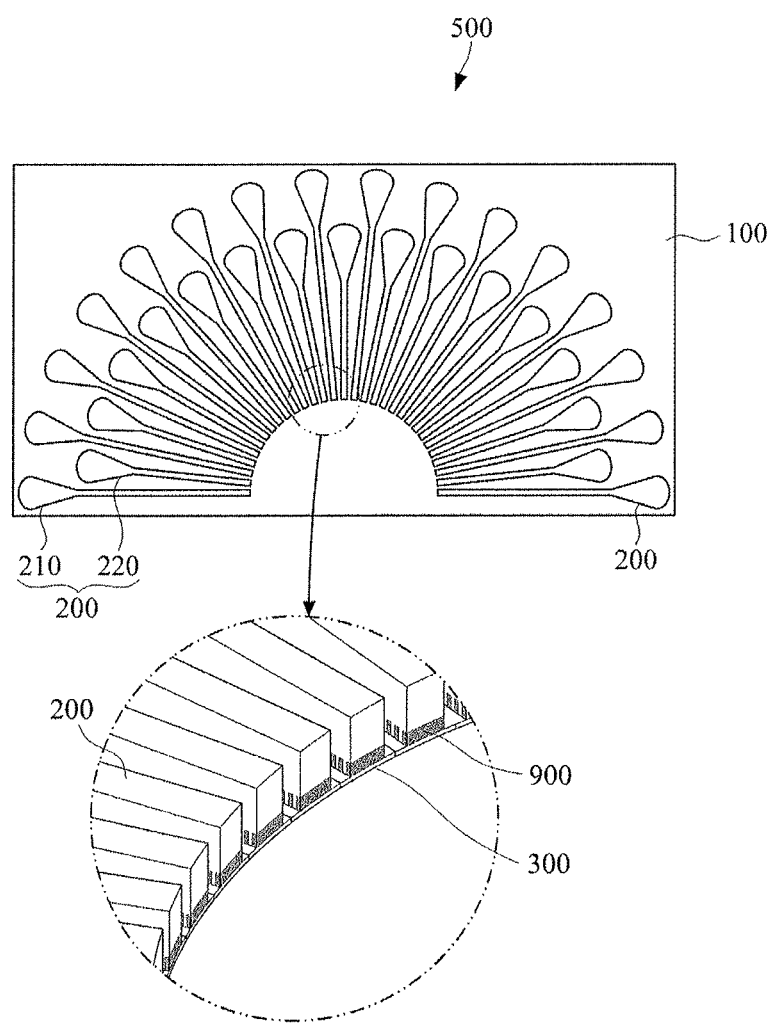
FIG. 5 illustrates an optical sensor according to another exemplary embodiment.

FIG. 5 illustrates an optical sensor 500 according to another exemplary embodiment.

Referring to FIG. 5, the optical sensor 500 includes a substrate 100, a plurality of ommatidias 200, and a plurality of optical detectors 300.

The substrate 100 includes a material having a first refractive index with respect to light. For example, the substrate 100 may be any of the substrate units 100 described above with reference to FIGS. 1, 2 and 3.

The ommatidias 200 include a material having a second refractive index with respect to light, and located on or inside the substrate 100. For example, each ommatidia 200 may be any of the ommatidia units 200 described above with reference to FIGS. 1, 2 and 3.

Also, the ommatidias 200 are arranged in a circular or partially circular shape on the substrate 100. In other words, the individual ommatidias 200 may be disposed toward different directions within a predetermined angle range between 0 and 360 degrees. For example, the ommatidias 200 may be disposed in a fan shape such that the microlenses (for example, the microlens 201 of FIG. 1) of the individual ommatidias 200 can receive light received at incident angles from 0 to 180 degrees. The number and arrangement angles of the ommatidias 200 may be set to appropriate values.

Also, the ommatidias 200 may include first ommatidias 210 and second ommatidias 220, which have different lengths. The length of each ommatidia 200 may indicate the length from one end of the corresponding microlens 201 to one end of the corresponding optical wavelength (for example, the optical wavelength 202 of FIG. 1), or indicate the length of the optical wavelength 202. As another example, each second ommatidia 220 having a relatively short length is disposed between two first ommatidias 210 having a relatively long length. In other words, the second ommatidias 220 and the first ommatidias 210 may be alternately disposed.

Each optical detector 300 may be located correspondingly to an end of each ommatidia 200. The optical detector 300 may be an arbitrary device that can receive light and generate an electrical signal corresponding to the received light. For example, if each optical detector 300 is near the optical wavelength (for example, the optical wavelength 202 of FIG. 1) of the ommatidia 200, the optical detector 300 may detect light transferred by the optical wavelength 202. The optical detectors 300 also may be, like the ommatidias 200, arranged in a circular or partially circular shape within a predetermined angle range between 0 and 360 degrees.

Also, the optical detectors 300 may be arranged in the lower portion of the substrate 100. When the optical detectors 300 are arranged in the lower portion of the substrate 100, gratings 900 for reflecting light passing through the ommatidias 200 toward the optical detectors 300 may be arranged near ends of the ommatidias 200.

Figure 6A:
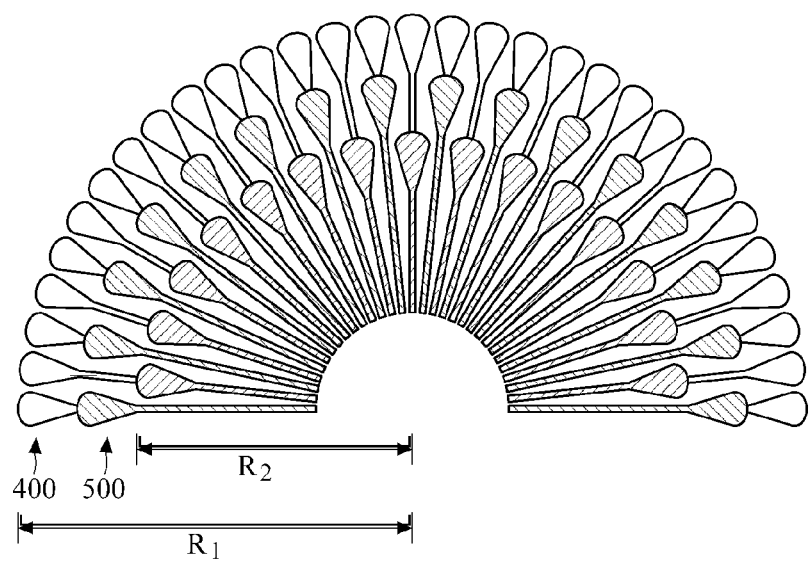
FIGS. 6A and 6B are views for explaining comparison results between the optical sensor illustrated in FIG. 4 and the optical sensor illustrated in FIG. 5.
Figure 6B:
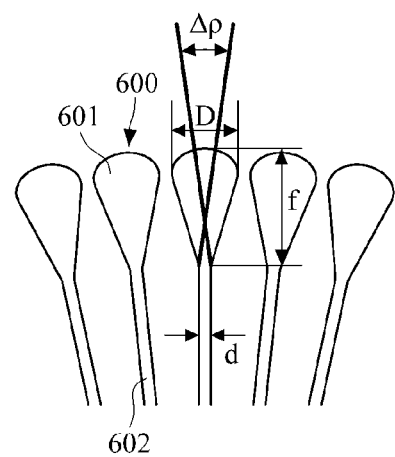
Figure 6B:
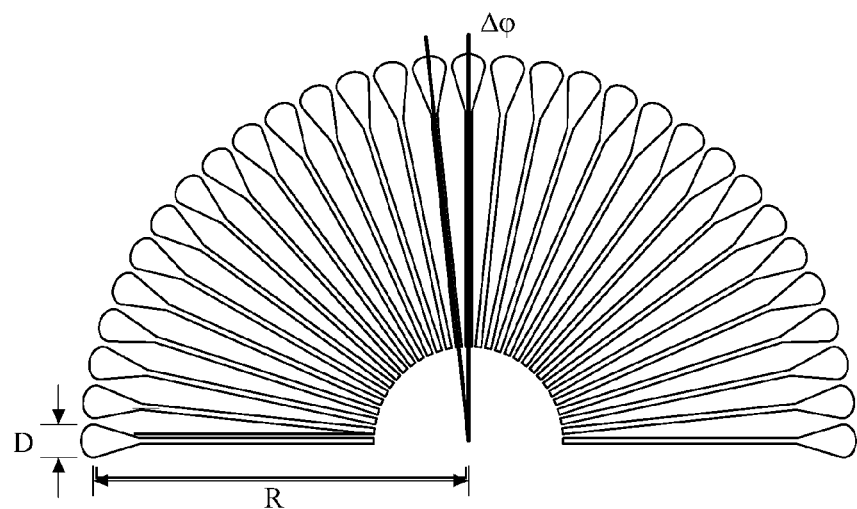

FIGS. 6A and 6B are views for explaining comparison results between the optical sensor illustrated in FIG. 4 and the optical sensor illustrated in FIG. 5.

In FIG. 6A, an average radius of a first optical sensor 400 is R1 and an average radius of a second optical sensor 500 is R2. The first optical sensor 400 may be according to an exemplary embodiment (see FIG. 4) where ommatidias having the same length are arranged, and the second optical sensor 500 may be according to another exemplary embodiment (see FIG. 5) where ommatidias having different lengths are alternately arranged. In the example of FIG. 6A, the average radius R1 of the first optical sensor 400 is smaller than the average radius R2 of the second optical sensor 500.

Referring to FIG. 6B, angular sensitivity of the optical sensor 400 or 500 may be calculated by Equation 1, below. Here, the angular sensitivity indicates an angle range of light within which an ommatidia 600 can react.

$$\Delta \rho = \sqrt{\left(\frac{\lambda}{D}\right)^2 + \left(\frac{d}{f}\right)^2}, \quad (1)$$

where λ represents the wavelength of light, D represents the size (or diameter) of a microlens 601, d represents the width of an optical waveguide 602, and f represents the focal distance of the microlens 601.

It can be seen from Equation 1 that the angular sensitivity of the optical sensor 400 or 500 has the relationship of Equation 2, below, with the size D of the microlens 601 and the width d of the optical waveguide 602.

$$\Delta \rho \propto \frac{d}{D}. \quad (2)$$

The angular sensitivity of the optical sensor 400 or 500 may approximate an angular resolution of the optical sensor 400 or 500, as provided in Equation 3, below.

$$\Delta \rho \approx \Delta \phi \quad (3).$$

Also, the angular sensitivity has the relationship of Equation 4, below, with the radius R of the optical sensor 400 or 500 and the size D of the microlens 601.

$$\Delta \phi \propto \frac{D}{R}. \quad (4)$$

That is, it can be seen from Equations 1 to 4 that the angular sensitivity or angular resolution of the optical sensor 400 or 500 is inversely proportional to the radius R of the optical sensor 400 or 500.

Referring again to FIG. 6A, as described above, the average radius R2 of the second optical sensor 500 is smaller than the average radius R1 of the first optical sensor 400. Accordingly, when each microlens of the first optical sensor 400 is the same size as the microlens of the second optical sensor 500, the second optical sensor 500 has a smaller size, higher optical sensitivity and higher optical resolution than the first optical sensor 400. Also, it is possible to increase the size of each microlens of the second optical sensor 500 when increasing the average radius R2 of the second optical sensor 500 to the average radius R1 of the first optical sensor 400.

Figure 7:
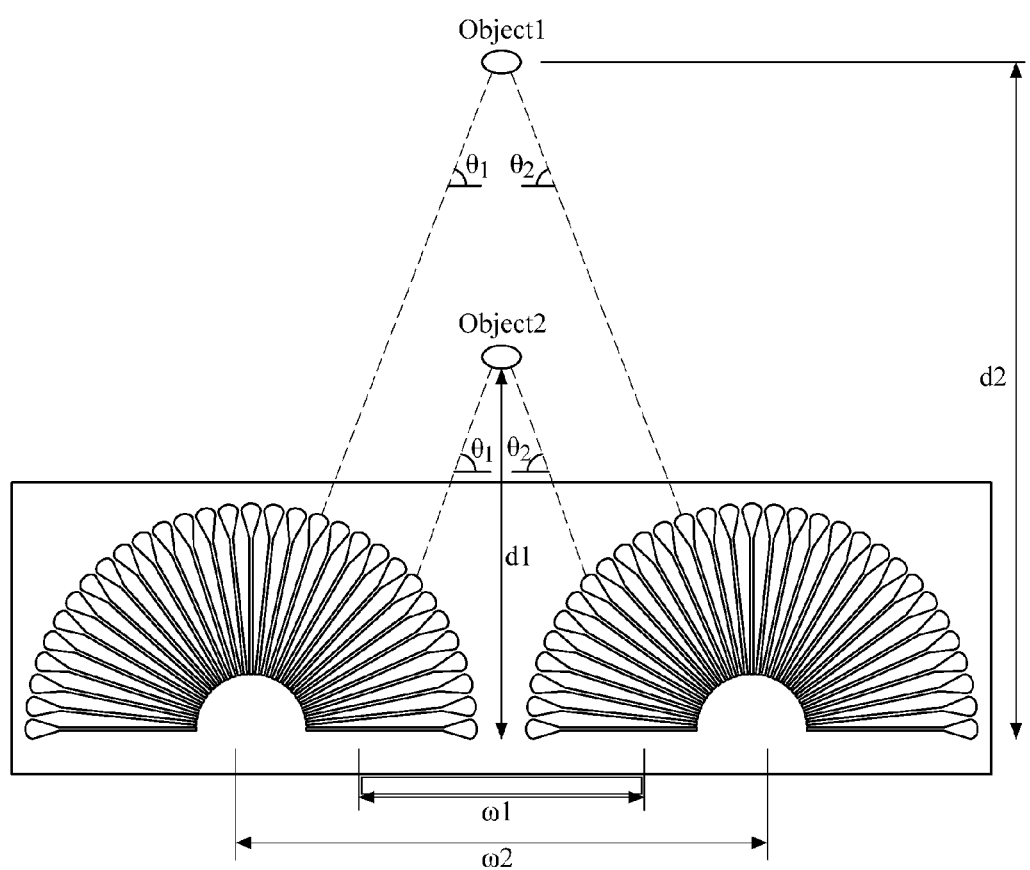
FIG. 7 illustrates a binocular apparatus to which the optical sensor illustrated in FIG. 4 is applied, according to an exemplary embodiment.

FIG. 7 illustrates a binocular apparatus to which the optical sensor illustrated in FIG. 4 is applied according to an exemplary embodiment.

Referring to FIG. 7, $\theta_1$ and $\theta_2$ respectively represent an angle between first and second objects Object1 and Object2 and one of two optical sensors and an angle between the first and second objects Object1 and Object2 and the other of the two optical sensor, $\omega_1$ and $\omega_2$ respectively represent a distance between points at which extended lines of lines connecting microlenses of ommatidias facing the second object Object2 to the second object Object2 meet the lower ends of the optical sensors, and a distance between points at which extended lines of lines connecting microlenses of ommatidias facing the first object Object1 to the first object Object1 meets the lower ends of the optical sensors, and $d_1$ and $d_2$ respectively represent a distance between the optical sensors and the second object Object2 and a distance between the optical sensors and the first object Object1.

Light reflected from an object placed at a specific location is input only to ommatidias that faces the object. Accordingly, by detecting which ommatidias in two optical sensors light is input to, θ and ω values may be calculated, and the θ and ω values are used to obtain the distance d between the optical sensors and the object.

According to an exemplary embodiment, a binocular apparatus having a vertical measurement range may be fabricated by stacking optical sensors vertically.

Figure 8:
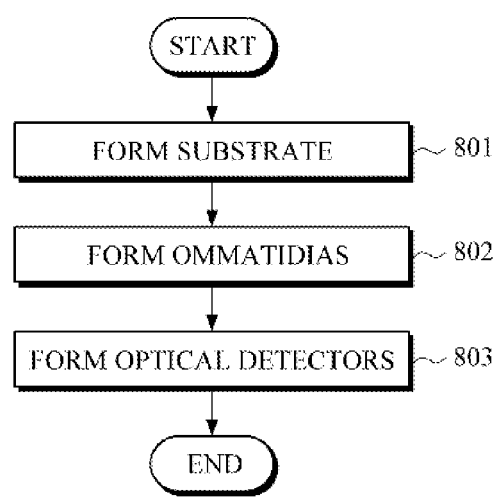
FIG. 8 is a flowchart illustrating an optical sensor fabricating method.

FIG. 8 is a flowchart illustrating an example of an optical sensor fabricating method according to an exemplary embodiment. The method may be an example of a method of fabricating the optical sensors illustrated in FIGS. 4 and 5.

Referring to FIGS. 4, 5 and 8, a substrate 100 is provided (operation 801). For example, the substrate 100 may be a glass substrate having a first refractive index.

Then, ommatidias are formed on or inside the substrate 100 (operation 802). A method of forming the ommatidias on or inside a substrate is not limited.

For example, ommatidias may be formed by a lithography process. In the lithography process, a photoresist and a mask are applied on the substrate 100 and then a pattern is formed through exposure. At this time, a pattern of the mask may correspond to a pattern of ommatidias 200 that are to be formed. For example, the mask may have a pattern in which a plurality of ommatidias are arranged along a circumference. Alternatively, the mask may have a pattern in which ommatidias having different lengths are alternately arranged along two circumferences. After the pattern is formed on the substrate 100, a material having a different refractive index from that of the substrate 100 is deposited according to the pattern, so that the ommatidias 200 are formed.

As another example, ommatidias may be formed by an imprinting process. For example, a material having a different refractive index from that of the substrate 100 is applied with a predetermined thickness on the substrate 100, and then a replication mold is imprinted on the substrate 100, so that ommatidias 200, 210 and 220 are formed. Here, the replication mold may be a pattern in which a plurality of ommatidias 200 are arranged along a circumference or a pattern in which ommatidias 210 and 220 having different lengths are alternately arranged along two circumferences. Also, a micro-imprinting process may be used to form ommatidias 200, as illustrated in FIG. 3, having a partially three-dimensional structure. Then, optical detectors are formed (operation 803).

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical sensor comprising:
a substrate;
an ommatidia located on or inside the substrate, the ommatidia comprising a microlens which receives light, an optical waveguide which transfers the light received through the microlens, and a cone structure comprising a first end connected to the microlens and a second end connected to the optical waveguide, the cone structure having a diameter or a width decreasing in a direction from the first end to the second end;
an optical detector which senses the light passing through the ommatidia; and
a grating which reflects the light passing through the ommatidia to the optical detector, wherein the optical detector is located in a lower portion of the substrate.

2. The optical sensor of claim 1, wherein the substrate comprises a material having a first refractive index, and the ommatidia comprises a material having a second refractive index that is different from the first refractive index.

3. The optical sensor of claim 1, further comprising:
a plurality of first ommatidias each having a first length; and
a plurality of second ommatidias each having a second length that is shorter than the first length,
wherein the plurality of first ommatidias and the plurality of second ommatidias are alternately arranged.

4. The optical sensor of claim 3, wherein the plurality of first ommatidias and the plurality of second ommatidias are disposed toward different directions within a predetermined angle range between 0 and 360 degrees.

5. The optical sensor of claim 1, wherein the microlens has a shape of a quarter globe, and the cone structure has a half conical shape.

6. The optical sensor of claim 1, wherein the cone structure has straight sides between the first end and the second end.

7. An optical sensor fabricating method comprising:
providing a substrate;
forming an ommatidia on or inside the substrate, the ommatidia comprising a microlens which receives light, an optical waveguide which transfers the light received through the microlens, and a cone structure comprising a first end connected to the microlens and a second end connected to the optical waveguide, the cone structure having a diameter or a width decreasing in a direction from the first end to the second end;
providing an optical detector to sense the light passing through the ommatidia, wherein the providing the optical detector comprises:
providing the optical detector in a lower portion of the substrate; and
providing a grating which reflects the light passing through the ommatidia to the optical detector.

8. The optical sensor fabricating method of claim 7, wherein the substrate comprises a material having a first refractive index, and the ommatidia comprises a material having a second refractive index that is different from the first refractive index.

9. The optical sensor fabricating method of claim 7, wherein the forming the ommatidia comprises forming a plurality of first ommatidias each having a first length, and a plurality of second ommatidias each having a second length that is shorter than the first length, through a lithography process or a micro-imprinting process, wherein the plurality of first ommatidias and the plurality of second ommatidias are alternately arranged.

10. The optical sensor fabricating method of claim 9, wherein the plurality of first ommatidias and the plurality of second ommatidias are disposed toward different directions within a predetermined angle range between 0 and 360 degrees.

11. The optical sensor fabricating method of claim 7, wherein the forming the ommatidia comprises forming the microlens in a shape of a quarter globe, and forming the cone structure in a half conical shape, through a lithography process or a micro-imprinting process.

12. The optical sensor fabricating method of claim 7, wherein the forming the ommatidia comprises forming sides of the cone structure between the first end and the second end in a straight or a curved structure.

* * * * *